N. HINMAN.
Horse Hay-Fork.
No. 93,439.
Patented Aug. 10, 1869.
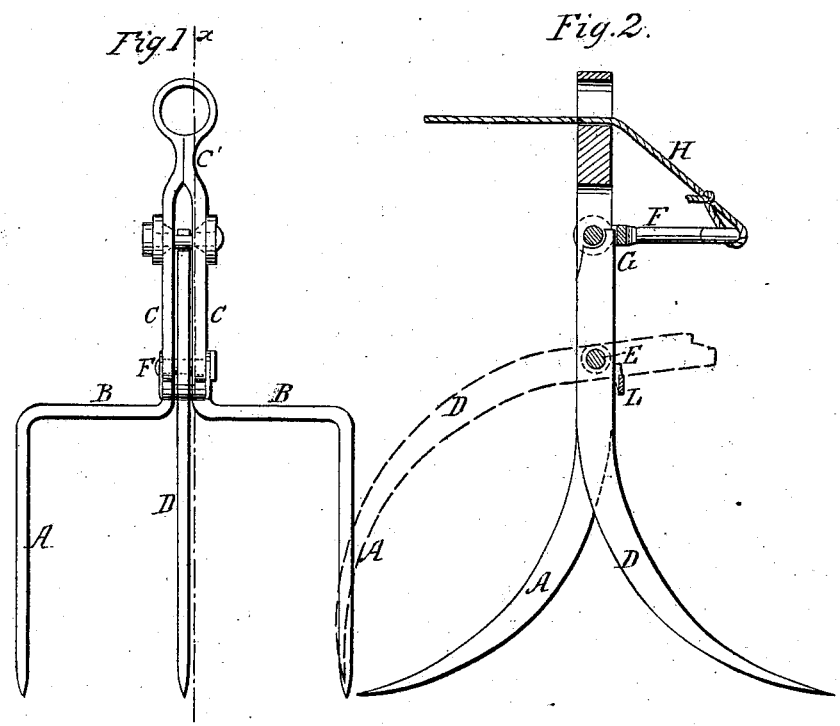

United States Patent Office.

NEWELL HINMAN, OF SPARTA, MICHIGAN.

Letters Patent No. 93,439, dated August 10, 1869.

IMPROVEMENT IN HORSE HAY-FORKS.

The Schedule referred to in these Letters Patent and making part of the same.

*To all whom it may concern:*

Be it known that I, NEWELL HINMAN, of Sparta, in the county of Kent, and State of Michigan, have invented a new and improved Hay-Fork; and I do hereby declare that the following is a full, clear, and exact description thereof, which will enable others skilled in the art to make and use the same, reference being had to the accompanying drawing, forming part of this specification.

The invention consists in the arrangement of a pair of branched curved tines, forming a bifurcated shank, to which the rope and locking-device are attached, and another short tine, bent in the opposite direction, is jointed, all as hereinafter more fully specified.

Figure 1 represents a side elevation of my improved fork.

Figure 2 represents a sectional elevation of the same.

Similar letters of reference indicate corresponding parts.

A A represent a pair of tines, bent at the head B, so as to bring the shanks c near together, and parallel to each other, forming a bifurcation for a considerable distance, above which they are permanently joined together at C'.

A single tine, D, is pivoted in the said bifurcation, at E, wherein also the locking-device F is pivoted.

The tines A and B are bent from the pivot-joint toward the points, in opposite directions, as shown in fig. 2, so that when the points are adjusted so as to meet and thrust into the mass of hay, they will separate, and assume the position shown, thus engaging the hay so as to hold it.

When in this position, the upper end of the tine D, wherein a circular recess is formed, will bear against the journal of the locking-dog F, and the latter, being turned down by the attendant, as shown, will engage the said end behind a shoulder, G, securely holding it until the said dog is tripped by a cord, H, passing through the eye of the shank, in a direction to raise the said shoulder G away from the end of the tine.

I represents a stop, to prevent the tine D from turning back beyond the points of the tines A, when being pushed into the hay, as shown in red.

Having thus described my invention,

What I claim as new, and desire to secure by Letters Patent, is—

The combination of the tines A and B, and the locking-dog F, when the said tines A constitute a bifurcated shank, C, and all arranged substantially as specified.

NEWELL HINMAN.

Witnesses:
  JOHN M. BALCOM,
  B. S. TUXBURY.